(12) United States Patent
Dragulinescu

(10) Patent No.: US 12,186,967 B1
(45) Date of Patent: Jan. 7, 2025

(54) MULTI-CAVITY MOULD, A HEATING ELEMENT FOR FORMING A SMOOTH PERIPHERY FOR THERMOFORMED THIN-GAUGE PLASTIC PRODUCTS AND METHOD FOR FORMING SUCH A PERIPHERY

(71) Applicant: Ionel-Dan Dragulinescu, Campulung Muscel (RO)

(72) Inventor: Ionel-Dan Dragulinescu, Campulung Muscel (RO)

( * ) Notice: Subject to any disclaimer, the term of this patent is extended or adjusted under 35 U.S.C. 154(b) by 0 days.

(21) Appl. No.: 18/800,070

(22) Filed: Aug. 11, 2024

Related U.S. Application Data

(63) Continuation of application No. PCT/RO2024/050007, filed on Jun. 20, 2024.

(51) Int. Cl.
  *B29C 51/34* (2006.01)
  *B29C 51/08* (2006.01)
  *B29C 51/42* (2006.01)

(52) U.S. Cl.
  CPC ............ *B29C 51/34* (2013.01); *B29C 51/082* (2013.01); *B29C 51/424* (2013.01)

(58) Field of Classification Search
  CPC ..... B29C 51/04; B29C 51/082; B29C 51/262; B29C 51/30; B29C 51/306; B29C 51/325; B29C 51/32; B29C 51/34; B29C 51/424; B29C 33/302; B29C 33/305; B29C 33/06; B29C 2043/3602; B29C 2043/3615
  See application file for complete search history.

(56) References Cited

U.S. PATENT DOCUMENTS

| | | | |
|---|---|---|---|
| 4,161,381 A | * | 7/1979 | Sciortino ............... A47J 43/282 425/286 |
| 9,908,281 B1 | | 3/2018 | Wallace |
| 11,981,067 B2 | | 5/2024 | Dragulinescu |
| 2022/0126501 A1 | | 4/2022 | Dragulinescu |
| 2022/0212393 A1 | * | 7/2022 | Dragulinescu ......... B29C 51/30 |

FOREIGN PATENT DOCUMENTS

| | | |
|---|---|---|
| EP | 3946891 B | 4/2023 |
| JP | 5514024 B | 2/2012 |
| WO | 2016085326 A | 6/2016 |
| WO | 2020219526 A | 10/2020 |

* cited by examiner

*Primary Examiner* — Yunju Kim
(74) *Attorney, Agent, or Firm* — Law Office of Andrei D Popovici, PC

(57) ABSTRACT

A multi-cavity mold (1) for a thermoforming machine used in high-volume, continuous thermoforming of thin-gauge plastic products (2) from a preheated thin-gauge thermoplastic sheet (3) comprising an upper tool (11) and a lower tool (12) arranged in a cooperating manner; the lower tool (12) comprising cavities (8) in which cavity molds (8') are placed and base plates (91) from which supporting blocks (92) extend perpendicularly over a predetermined total height (a), situated between adjacent cavities (8), each supporting block (92) comprising two zones, a first substantially rectangular shaped zone (92a) and a second substantially isosceles trapezoid shaped zone (92b) in a vertical cross section through a y-z plane and two vertical channels (81) to alter, during forming of the products (2), a thickness of a peripheral flange (B), to decrease from a medium thickness (t) to a lesser thickness (t1).

13 Claims, 7 Drawing Sheets

MULTI-CAVITY MOULD, A HEATING ELEMENT FOR FORMING A SMOOTH PERIPHERY FOR THERMOFORMED THIN-GAUGE PLASTIC PRODUCTS AND METHOD FOR FORMING SUCH A PERIPHERY

FIELD OF THE INVENTION

The present invention relates to the field of machines which thermoform thin-gauge plastic sheet material into various parts and/or products, particularly to a multi-cavity mould for a thermoforming machine and to a heating element for forming a smooth periphery for thermoformed thin-gauge plastic products and to a method for forming such a smooth periphery for thermoformed thin-gauge plastic products.

BACKGROUND OF THE INVENTION

The thermoforming process is widely used in the packaging industry to make various products from sheets (sometimes referred to as "films") of thermoplastic material, which is a substance (especially synthetic plastic or resin) becoming soft and moldable when subjected to heat and regaining its solid state when cooling, without appreciable change of properties.

The thermoforming process (also known as "thermoforming cycle") is a manufacturing process for thermoplastic sheet or film. Specifically, it is more of a converting process, where thermoplastic sheet or film is converted into a formed/shaped, finished part/product. The thermoforming process takes a sheet of thermoplastic, carefully heats it until it is sufficiently pliable, places it over a forming mold that forms it into a three-dimensional shape, and completes the process by trimming and finishing it into the desired shape of the product. It is a simple process that is quick, efficient, time-saving, and highly productive. The sheet or film is heated in an oven to its forming temperature, then stretched into or onto a mould, whose shape it takes and then cooled. Depending on the application, the thermoforming process uses thin-gauge or thick-gauge sheets of thermoplastic material. Thin gauge thermoforming produces products/parts with thicknesses of less than 0.060" (1.5 mm). Thermoplastics are roll-fed or come from an upstream extrusion process. Thin gauge thermoforming, produces thin products which are intended for disposal or recycling but are an important part of everyday life. Thin-gauge films are used to manufacturing trays, containers, disposable cups, blisters, etc. They have wide applications in the food, fast moving consumer goods, and medical industries. The thin-gauge thermoplastic films are usually wrapped up on a reel of cardboard and have a nominal thickness between 0.2 mm and 2 mm. The known thermoplastic materials used are: Polypropylene (PP), Polystyrene (PS), Polyethylene terephthalate (PET) and the combinations thereof.

During the thermoforming process of thin-gauge plastic products, the thin-gauge thermoplastic film is fed through the thermoforming machine, either continuously from a roll or in cut sheets and is subsequently heated to allow forming of the plastic. Plastic sheet to be molded, which has length and width greater than the finished product, is clamped into a holding device and transported into a heating equipment to raise it to the forming temperature. The sheet is heated by contact heating using panel and rods (conduction), by exposing them to circulating hot air or using infrared heaters. The type of heating system is chosen depending on the material and the amount of necessary heat. The heating process is critical to the forming process since it creates the necessary pliability and flexibility. Then, the heated plastic material is shaped in moulds (which can be plug moulds or cavity moulds) to produce the shapes of the various desired parts or products, then cooled and trimmed to separate the parts/products from the surrounding scrap sheet/film (sometimes referred to as "web").

Thermoforming machines typically include:
- an oven or heating station, in which the thermoplastic sheet of material is heated to the forming temperature so that it may be stretched into or onto a mould;
- a forming station in which the heated plastic is formed into the desired shapes by mould portions which are arranged in a cooperating manner to engage with one another, usually named "upper tool" and "lower tool"; The plastic thermoforming moulds for a thermoforming machine usually comprise one pair of complementary tools (i.e. upper tool and lower tool) in which: male (also known as "plug moulds" or "positive moulds") and female (also known as "cavity moulds" or "negative moulds") are provided. Either one of the upper tool and lower tool may comprise the male or female components of the mould. Thus, the term "upper" tool in the context of the present invention must be understood as a tool that is situated above the "lower" tool such that both tools can engage with one another in a complementary way. At the same time, the "lower" tool is the tool that is situated below the "upper" tool such that both tools can engage with one another in a complementary way. The "upper" tool and the "lower" tool can be reversed or change their position relative to each other in a vertical plane that includes both of them. The cavity moulds are placed in cavities provided inside one of the molding tool's main body. The term "cavity", used in the thermoforming technical field, refers to an empty space or to a hole inside a main body of a molding tool where the cavity moulds are inserted. With male moulds, the thermoplastic sheet is formed over the surface of the male mould. With female moulds, the thermoplastic sheet is formed inside of the female mould's surface. Male moulds are used when the inside dimensions of the plastic part are a priority. Female moulds are used when the part's or products outer dimensions are more important than its inner dimensions. The exterior surface of a positive mold tool will give the shape of the inner surface of the part/product. After forming, the plastic containing the new shape solidifies by cooling using air circulation or liquid cooling systems. The tool material used significantly affects the cooling cycle, thus also affecting the quality of the parts.
- a trim or cutting station where the formed parts/products are cut or separated from the web and
- a stacker station where the separated parts/products resulting from the cutting station are stacked and transported to the packing station. The stacker station may comprise a mechanical stacker or a down stacker or a robotic stacker or any other manipulation device.

Conventional thermoforming machines with multi-cavity mould produce two or more identical parts/products at one press s troke. The formed identical parts/products are then trimmed individually from the sheet of plastic material leaving a skeleton of scrap material which has to be discarded or recycled. This is due to the spaced-apart layout of the cavities inside a multi-cavity mould. By "adjacent" relative to an element, for example relative to another cavity/cavity mould or edge, in this context it must be interpreted particularly as "neighboring" or "next to" that cavity/cavity mould or edge, placed in the same plane or in parallel planes. Usually, the standard distance between adjacent cavity moulds is of 12-40 mm. This is due to the configuration of a supporting block (i.e. a metal block, typically of a rectangular shape, which extends perpendicularly from a base plate inside the main body of a mould, over a predetermined total height, situated between adjacent cavities). This supporting block has to confer increased rigidity to the tool's main block and to the cavity moulds, as well as high mechanical resistance during the thermoforming process at multiple press strokes. Therefore, the standard minimum distance between adjacent cavity moulds is of 12 mm to ensure an increased rigidity and mechanical resistance of the supporting block. Thus, a considerable amount of unformed plastic material remains between the edges of the parts/products formed as well as between the edges of the parts/products formed and the surrounding plastic sheet margins. Also, the minimum distance between adjacent cavity moulds is of 12 mm to ensure adequate space for the configuration of the ventilation channels inside the mould; The ventilation channels are vent holes around the periphery of the cavity moulds and in areas requiring crisp detail; these channels are so small that they do not deform the plastic material which will line the cavity mould during moulding, but at the same time are large enough to permit the trapped air to escape from the cavity mould. Other reasons to maintain a minimum distance of 12 mm between adjacent cavity moulds are:

to allow for an easy transport of the formed/trimmed products by using the unformed plastic material between adjacent products (the formed and then trimmed thin-gauge plastic products may remain attached to the thermoplastic sheet via tiny precise notches (also called "nicks") to be easily transported to the next station);

adequate space for cooling circuits (usually water cooling circuits) for the formed parts/products inside the cavity moulds; The cooling circuits are straight cooling channels within the mould, which serve to cool and harden the part/product in contact with the cavity mould;

to ensure an easy trimming of the formed parts/products inside the thermoplastic sheet (only on the top contour of the formed product).

Also, different thermoforming machines are known. The preferred thermoforming machines used in the process of high-volume, continuous thermoforming of thin-gauge plastic products are the Form/Cut/Stack, In-Mould-Cut, Cut-in-Place and Integrated Punch-and-Die Cutting and Stacking thermoforming machines. These machines can be combined with common-edge-cut tooling technology, for example, the technology described in EP3946891B1.

The known techniques used for the cutting or separation stage are:

cutting/shearing usually by using a punch or moving blade and a die or fixed blade and die cutting by using a cutting head (usually a steel rule die i.e. a sharpened metal band used in compression cutting) and a press head (which serves as a surface against which the die performs the cutting operation). "Steel-rule dies", also known as "cookie cutter dies" (because these dies cut on the contour of the part/product), are used for cutting sheets of softer materials, such as plastics. The cutting surface of the die is the edge of hardened steel strips, known as "steel rule". Depending on the die cutting operation, the press head is designed to accommodate or work in conjunction with the custom design of the steel rule die. Once the material enters the cutting station and is properly positioned beneath the cutting head, the cutting head begins a downward stroke which applies vertical pressure perpendicular to the plane of the material's surface. The movement and pressure cause the steel rule die to compress the material against the press head until the die's edge penetrates the material. This action produces the desired cuts or perforations on the material. The dies can use instead of steel rule dies also forged dies or CNC dies (i.e. Computer Numerical Control (CNC) tools used for cutting various hard materials, such as wood, composites, aluminum, steel, plastics, glass, and foams; tool paths are controlled via computer numerical control), which are known as solid dies. The main advantage of steel-rule dies is the low cost to make them, as compared to solid dies; however, they are not as robust as solid dies, so they are usually only used for short production cycles.

In the Form/Cut/Stack thermoforming machine, the heating, forming, cutting and stacking operations are accomplished in separate stations, in different subassemblies of the thermoforming machine and the desired geometry is accomplished with the benefit of a mechanical plug assist (i.e. a mechanical device used to aid or assist sheet stretching prior to total contact with the mould).

The Cut-in-Place thermoforming machine integrates heating, forming and cutting into one station. This can be accomplished because, for example in a Cut-in-Place thermoforming machine, the mould is mounted to an upper platen, inside of the perimeter of the forged steel die, for example, directly above the lower heated platen. The process begins by first holding the sheet of material against the heated platen by means of pressurized air introduced through the mould, or creating vacuum through the heated platen, after the leading edge of the forged steel cutting die engages the surface of the plastic. This contact provides the seal needed for the next step in the forming process. Pressurized air, usually introduced through the heated platen, pushes the heated plastic into the mould geometry mounted inside the perimeter of the forged steel die. After cooling, the forged steel die is pushed the rest of the way through the plastic, into contact with the platen, and the part is cut. The part inside the web is ejected from the mould by means of pressurized air, spring assisted ejection rings, or both. It is then conveyed to the next station inside the web. This is facilitated by tiny precise notches (also called "nicks") in the cutting edge of the die. These notches hold the plastic parts/products in the web while being conveyed, but are kept small enough so the parts/products can be easily separated from the web for packing.

The In-Mould-Cut thermoforming machine is similar with the Cut-in-Place thermoforming machine because it combines the forming and cutting operations in the same station. The only difference is that the heating of the sheet is made in a heating station, separated from the forming-cutting station, by means of electrical heaters, usually from both sides of the sheet for increased efficiency.

The Integrated Punch-and-Die Cutting and Stacking thermoforming machine comprises two different main stations, called forming station and the combined cutting-stacking station. Sometimes, between the forming station and the combined cutting-stacking station there could be extra auxiliary features, for example, ventilation holes, pads and so on. In the combined cutting-stacking station, the parts/products are being separated from the web, entirely on their perimeter, by using a punch and a die system or sometimes called matched-metal. A system of punches pushes the thermoformed parts/products through a system of dies. The parts/products being fully trimmed/cut are then stacked on top of each other for packaging purposes, either manually or with an accumulation device (i.e. basket).

The remaining portion of the sheet from which the parts/products have been cut-commonly known as "skeleton" or "web"—is waste material and is discarded, recycled or is sold as scrap plastic.

Trimming of waste material from one or more edges of a shaped part/product is a common finishing technique, but leaves a sharp edge that can injure flesh or tear or cut materials which come into contact with the edge. One common use for shaped thermoplastics is to form containers that can be sealed with thin plastic films, such as trays, bowls, or bins intended to contain foodstuffs and intended to be sealed with transparent plastic film. Another common use is to contain items and to seal them from moisture or other materials which may come into contact with the container. Sealing of such containers typically involves extending or stretching the film across a compartment formed in the container and sealing the film around the periphery of the compartment, which periphery is often situated adjacent a trimmed edge of the product that includes the compartment. If that edge is sharp, it can cut or break the film, interfering with the sealing process.

Three well-known sealing technologies are commonly used in sealing foods and foodstuffs to form containers for commercial shipping, storage, display, and sale. These are referred to herein as OW, VSP, and MAP technologies. All of these technologies involve combining a container and a thin plastic film. Owing to the fragility of such films and the need, in many instances, to minimize or eliminate punctures and tears from film portions which serve to define (together with the container) sealed compartments, it is critical to minimize the opportunities for containers to tear, puncture, or abrade the film of the same or nearby containers. In addition to plastic films used for sealing such containers, plastic films are also employed for shipping the containers, such as the "mother bags" (i.e., typically thin plastic bags) used for containing multiple product-in-container-packages during shipping and the plastic grocery bags used by consumers to transport purchased goods from a retailer. This can be achieved by reducing or eliminating sharp or rough container edges, at least positions on the container at which such edges might reasonably contact the film during packaging, storage, shipment, or display.

In the known Overwrap (OW) technology, sharp or rough edges of the shaped part/product (e.g., a thermoformed tray, sheet, bowl, or multi-compartment container) can cut, abrade, or puncture the thin (often transparent) plastic film that was wrapped or enveloped over the shaped product, potentially allowing materials to pass through the film and defeating one or more of its purposes. It would be desirable if a thermoformable plastic container suitable for use with multiple wrapping technologies, including OW technology, could be made, since thermoformable materials tend to be widely acceptable in recycling programs. Vacuum-sealed package (VSP) technology involves adhering a thin (again, often transparent) plastic film against a face of a shaped product bearing a foodstuff for example, or a moisture-sensitive object as an alternate example on a face of the shaped product. The seal can be resistant to gas flow in order to maintain the gas-evacuated state on the interior of the sealed container. The resulting VSP-sealed package typically has a topology that mimics the shape of the surface of the shaped article having the item(s) thereon. MAP is an abbreviation for modified atmosphere packaging and refers to a sealing technology in which a flexible (often transparent) film is sealed (e.g., using heat or an adhesive) about the perimeter of a substantially rigid shaped product. When the shaped product is otherwise closed (i.e., when it has no other openings than that sealed by the film), the gases present within the container can be controlled at the time the film is sealed to the product. Thus, if the article and film are sealed in the presence of a selected atmosphere (e.g., a gas, such as one selected to exclude oxygen or to promote fruit ripening), the selected atmosphere can be maintained within the sealed MAP package during subsequent storage, shipping, and display of the package.

As is known in the art, the shaped products used in OW, VSP, and MAP sealing processes tend to have a variety of industry-accepted geometric shapes and properties which differ among the three types, such that a shaped product useful in one type of sealing process is often poorly suited for use in one or both of the others. For example, containers used for OW-sealing, tend to be rectangular and tray- or sheet-shaped, with smooth, blunt edges and rounded corners. The lack of sharp, rough, or pointed edges or corners serves to reduce the likelihood that the film used for overwrapping the container will be torn or punctured upon wrapping. OW-containers often have a flat portion (e.g., on the "bottom" of the container, relative to its intended display configuration) at which the overwrapped film can be urged against itself for the purpose of sealing the film to itself (e.g., upon application of heat to the overlapping film portions sufficient to cause such sealing), thus enclosing the container and any items on or in it.

It would be beneficial if the sharp edges of shaped thermoplastic parts/products could be displaced in such a way that the risk of injury or damage to sealing films could be reduced. It would be further beneficial if such individual shaped parts/products could be used with multiple known sealing technologies, such as two or more of OW, VSP, and MAP technologies. Reducing the sharpness and tendency of thermoformed parts/products to induce damage and injuries would be advantageous even in the absence of sealing.

Others have recognized the desirability of reducing the occurrence of sharp edges at the edges of trays to be overwrapped. For example, PCT Patent Application Publication No. WO2020219526A1 and U.S. Pat. No. 9,908,281B1 disclose forming shaped thermoplastic products having smooth peripheries and methods of forming a smooth periphery for such sharp-edged products or articles by rolling over the sharp edge. The smoothing operation is performed by forming a deflectable flange including a bend region separated from the potentially sharp peripheral edge by a spacer, deflecting a portion of the deflectable flange with or without a ram, and softening at least one bent portion of the deflectable flange to yield a smooth periphery upon cooling. The disclosure also relates to articles processed according to those methods and to equipment for performing such processing. However, the peripheral flange distance is selected to yield a desired degree of deflection when it is impinged against a surface with or without a profiled ram. This mechanical step generates some unaesthetic creases at the corners of the shaped thermoplastic article/product that can induce damage to the sealing films or to a user's tissue when the sealed article is being manipulated, especially in the corner areas. Therefore, such individual shaped articles/parts/products could not be used with multiple known sealing technologies, such as two or more of OW, VSP, and MAP technologies. The equipment for performing such processing cannot be used with any other thermoforming machine with a mechanical stacker, down stacker, robotic stacker or any other manipulation device. The additional features (e.g. an upper body which can urge the deflectable flange inside a cavity or a number of profiled rams which impinges upon and further deflect the deflectable flange) used for such an equipment for forming a smooth periphery for such sharp-edged articles increase considerably the total production costs for the thermoforming moulds and the precision alignment capabilities of these features are poor. Also, the deflectable flange has a considerable length to be able to deflect correctly. The amount of thermoplastic material used in this process is higher compared with the amount used to form shaped products without a smooth periphery, thus increasing the production costs.

PCT Patent Application Publication No. WO2016085326A1 discloses a method of manufacturing a plastic container having a curled rim which method comprises the steps of providing a sheet of plastic material; drawing a portion thereof into a mould to form a bottom and wall of the container, leaving a surrounding portion of material to form a rim of the container; cutting the rim loose from a remaining portion of material; and curling the rim. In the curling step, an inner part of the rim is supported by a supporting member while an outer part is pressed by a pressing member moving relative to the supporting member for the rim to be bent around the supporting member. The rim may be provided with a groove that is formed by defining a folding line to enable bending of the rim. Thus, a mechanical method is used also for this case. Japanese Patent Application Publication No. JP05514024B2 discloses a method to form a curled edge portion by smoothly curling an opening edge of a moulded product for packaging. The curling is performed by heating the perimeter of the flange with hot air, thereby curling only the flange toward an opposite side of a curling prevention surface to form a smooth curled edge part. In this case, the heating of the flange is done in an uncontrolled manner with the risk of deformation by heat shrink of the flange's parts.

Thermoformed drinking cups having smooth, rolled edges are also known. Such cups are made by thermoforming cups having a flange about the perimeter of the cup opening, the flange including a potentially sharp peripheral edge at the flange end distal to the interior of the cup. The flanged cups are stacked in a nested fashion, heated at their flange portions, and then passed through helical rim-rolling threads to create the rolled edge. Such technology is useful only for rolling the edge surrounding a circular orifice, and is therefore of no practical use in making shaped articles having rolled edges surrounding non-circular openings. Rolled-edge drinking cups are also not designed to facilitate wrapping or sealing with thin plastic films.

An efficient and cost-effective multi-cavity mould for a thermoforming machine used in the process of high-volume, continuous thermoforming of thin-gauge plastic products and a heating element suitable to be used with said thermoforming machine for forming a smooth periphery for thermoformed thin-gauge plastic products that addresses these conventional inefficiencies is therefore needed.

SUMMARY OF THE INVENTION

The present invention provides a solution to the above mentioned inherent problems associated with the known equipments for forming a smooth periphery for thermoformed thin-gauge plastic products.

The main objective technical problem is how to improve the efficiency of a thermoforming machine for forming a smooth periphery for thermoformed thin-gauge plastic parts/products in order for such shaped parts/products to be used with multiple known sealing technologies, reducing the sharpness and tendency of thermoformed parts/products to induce damage, even in the absence of sealing, while maintaining a reduced use rate of thermoplastic material and lower production costs.

The purpose of the present invention is to remedy the above mentioned drawbacks of the prior art by disclosing a multi-cavity mould as a forming station of a thermoforming machine which allows a further extension of a predetermined length of the peripheral flange and a heating element placed inside the stacking station of the thermoforming machine to direct hot air at a regulated temperature during a predetermined exposure period around the pre-extended peripheral flange to gradually increase its thickness obtained in the pre-extended state to the medium thickness of the thermoformed thin-gauge thermoplastic sheet without exceeding the medium thickness by developing a partial curled region oriented towards an interior side of the plastic sheet or towards a corresponding exterior wall of each of the thermoformed thin-gauge plastic products, thus forming a smooth periphery. The present invention also relates to a method for forming a smooth periphery for a thermoformed thin-gauge plastic product.

These are achieved in accordance with the invention having the characteristics of the independent claims 1, 5 and 13.

Advantageous embodiments of the invention will appear from the dependent claims.

The multi-cavity mould for a thermoforming machine used in the process of high-volume, continuous thermoforming of a plurality of thin-gauge plastic products from a preheated thin-gauge thermoplastic sheet which allows a further extension of a predetermined length of the peripheral flange according to claim 1 comprises: an upper tool and a lower tool arranged in a cooperating manner;
   the upper tool comprising:
      a top base plate and
      a plurality of plug moulds arranged in an x-z array and connected in a translational manner to said top base plate by means of driving rods such that said plug moulds are movable in a direction perpendicular to a transport direction of said preheated thin-gauge thermoplastic sheet;
   the lower tool comprising:
      a plurality of cavities in which cavity moulds may be placed and
      a plurality of base plates from which a plurality of supporting blocks extend perpendicularly over a predetermined total height, situated between adjacent cavities,
the upper tool and the lower tool are being operable to simultaneously form a plurality of thin-gauge plastic products in corresponding cavity moulds arranged inside the cavities of said lower tool in an x-z array and
each of said supporting block has a first substantially rectangular shaped zone in a vertical cross section through a y-z plane, said first zone extending perpendicularly from said base plate over a distance calculated as 92-95% of the total height of said supporting block and the width of the first zone is calculated as 10-15% of the total height of said supporting block
characterized in that each of said supporting block has a second substantially isosceles trapezoid shaped zone, having a common symmetry axis with said first substantially rectangular shaped zone in the vertical cross section through the y-z plane perpendicular to said base plate, wherein said second substantially isosceles trapezoid shaped zone extends in continuation of said first zone over a distance calculated as 5-8% of the total height of said supporting block, wherein the second zone has a bottom base in contact with the first zone and centered relative to said common symmetry axis, a top base and two legs of equal length between the top and bottom bases, and the width of the top base of said second zone is calculated as 2.5-5% of the total height of said supporting block and two vertical channels are formed between at least two adjacent cavity moulds for accommodating a peripheral flange of each of said thermoformed plastic products, such that said two vertical channels are configured to alter, during forming of the plurality of thin-gauge plastic products, a thickness of said peripheral flange, to decrease from a medium thickness of the thermoformed thin-gauge thermoplastic sheet to a lesser thickness.

The heating element for forming a smooth periphery for a plurality of thermoformed thin-gauge plastic products, formed in a multi-cavity mould as described above and according to claim 5 comprises:
  a substantially concave-shaped manipulation device for holding therein each of said thermoformed thin-gauge plastic products such that a peripheral flange of each of said thermoformed plastic products is extending over each wall of said concave-shaped manipulation device;
  a radiant heated peripheral plate disposed at a minimum distance, around each wall of said concave-shaped manipulation device to create a gap for accommodating said peripheral flange therein and
  a control unit connected to the radiant heated peripheral plate
  an insulation plate disposed between a stripper plate and said radiant heated peripheral plate
characterized in that said radiant heated peripheral plate comprises:
  a housing for an electric heating source mounted therein;
  a plurality of hot air distribution channels which are in fluid communication with said electric heating source and with a plurality of outlet slits configured to direct a flow of hot air at a regulated temperature during a predetermined exposure period set by the control unit around said peripheral flange which has a lesser thickness compared to a medium thickness of the thermoformed thin-gauge thermoplastic sheet of each of said thermoformed thin-gauge plastic products
such that said peripheral flange's lesser thickness of each of said thermoformed thin-gauge plastic products is configured to gradually increase from said lesser thickness to the medium thickness of the thermoformed thin-gauge thermoplastic sheet without exceeding the medium thickness upon exposure to said flow of hot air at said regulated temperature and during said predetermined exposure period, by developing a partial curled region oriented towards an interior side of said preheated thin-gauge thermoplastic sheet or towards a corresponding exterior wall of each of said thermoformed thin-gauge plastic products, said partial curled region having a smooth exterior contour.

The method for forming a smooth periphery for a plurality of thermoformed thin-gauge plastic products, formed in a multi-cavity mould of a thermoforming machine as described above and according to claim 13 comprises the following successive steps of:

a) feeding a preheated thin-gauge thermoplastic sheet between the upper tool and lower tool of the multi-cavity mould in a transport direction;
b) forming said thermoformed plastic products in corresponding cavity moulds arranged inside the plurality of cavities of the lower tool in an x-z array and simultaneously altering a thickness of the peripheral flange of each thermoformed plastic products to decrease from a medium thickness of the thermoformed thin-gauge thermoplastic sheet to a lesser thickness within the two vertical channels;
c) transporting the thermoformed plastic products located inside said thin-gauge thermoplastic sheet further to a cutting station of said thermoforming machine;
d) cutting along a contour line of the products within the cutting station;
e) transporting the cut thermoformed plastic products to a stacker station of said thermoforming machine comprising a heating element according to any of claims 5 to 11;
f) bringing the cut thermoformed plastic products in a position where their peripheral flange is accommodated inside the gap and aligned with the outlet slits of said heating element;
g) directing a flow of hot air at a regulated temperature around the peripheral flange of each thermoformed plastic product through the outlet slits during a predetermined exposure period set by the control unit to determine said peripheral flange's lesser thickness of each of said thermoformed thin-gauge plastic products to gradually increase from said lesser thickness to the medium thickness of the thermoformed thin-gauge thermoplastic sheet without exceeding the medium thickness by developing a partial curled region oriented towards an interior side of said preheated thin-gauge thermoplastic sheet or towards a corresponding exterior wall of each of said thermoformed thin-gauge plastic products, said partial curled region having a smooth exterior contour;
h) stacking the thermoformed thin-gauge plastic products with said partial curled region having a smooth exterior contour for future packaging options.

DETAILED DESCRIPTION OF EMBODIMENTS OF THE INVENTION

In the following detailed description, reference is made to the accompanying drawings that form a part hereof, and which only have an illustrative, not limiting value.

Figure 1:
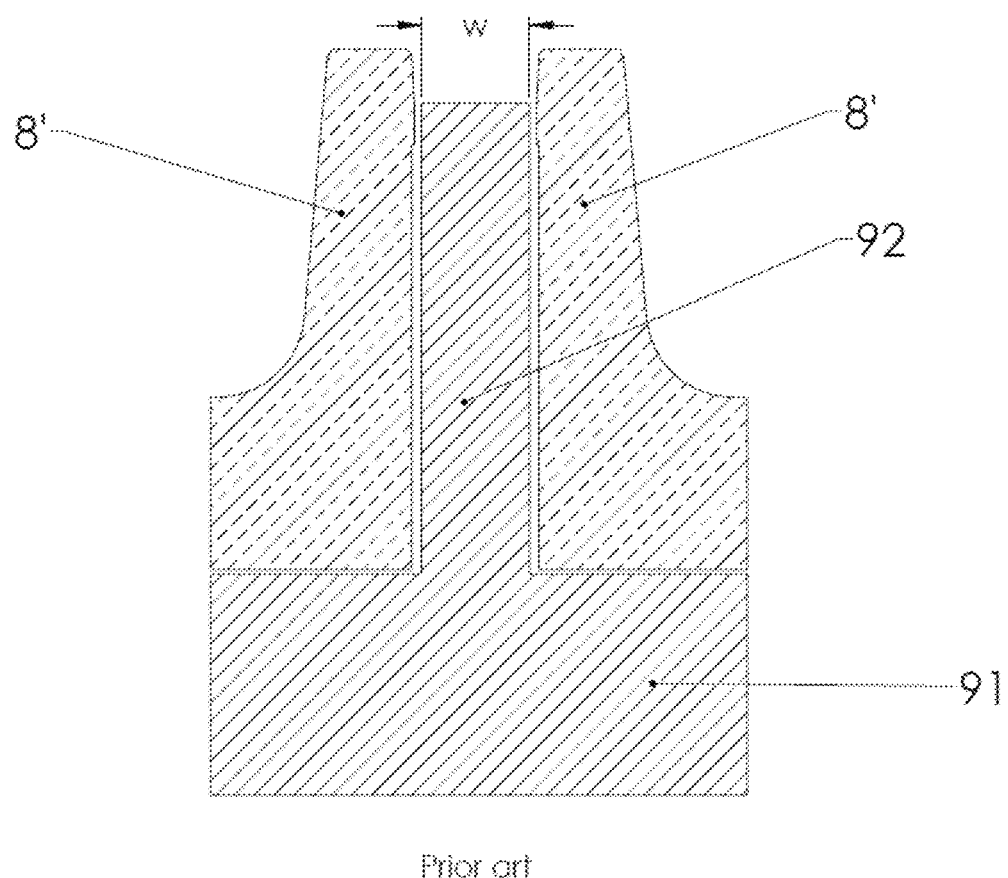
FIG. 1 depicts a detailed front view in a vertical cross section of a conventional supporting block of a multi-cavity mould.
Figure 2:
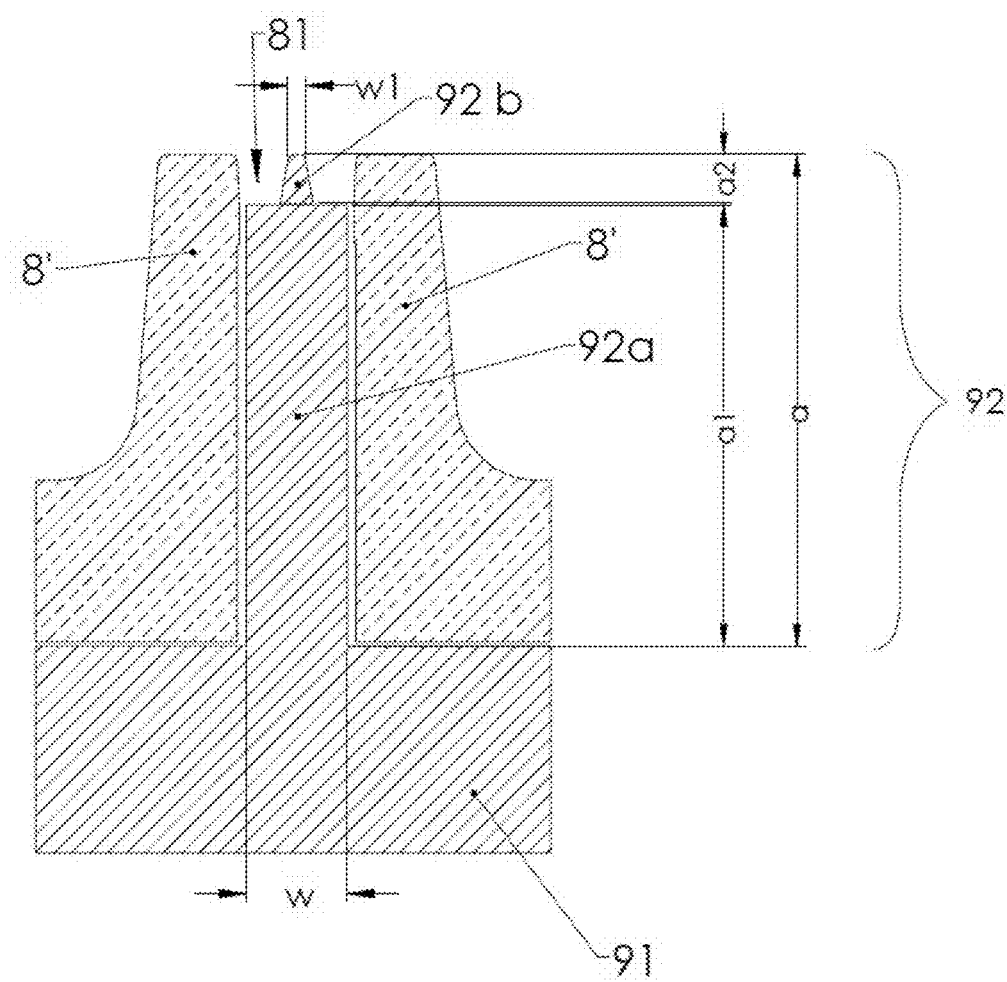
FIG. 2 depicts a detailed front view in a vertical cross section of an embodiment of a supporting block of a multi-cavity mould in accordance with the present invention.
Figure 3:
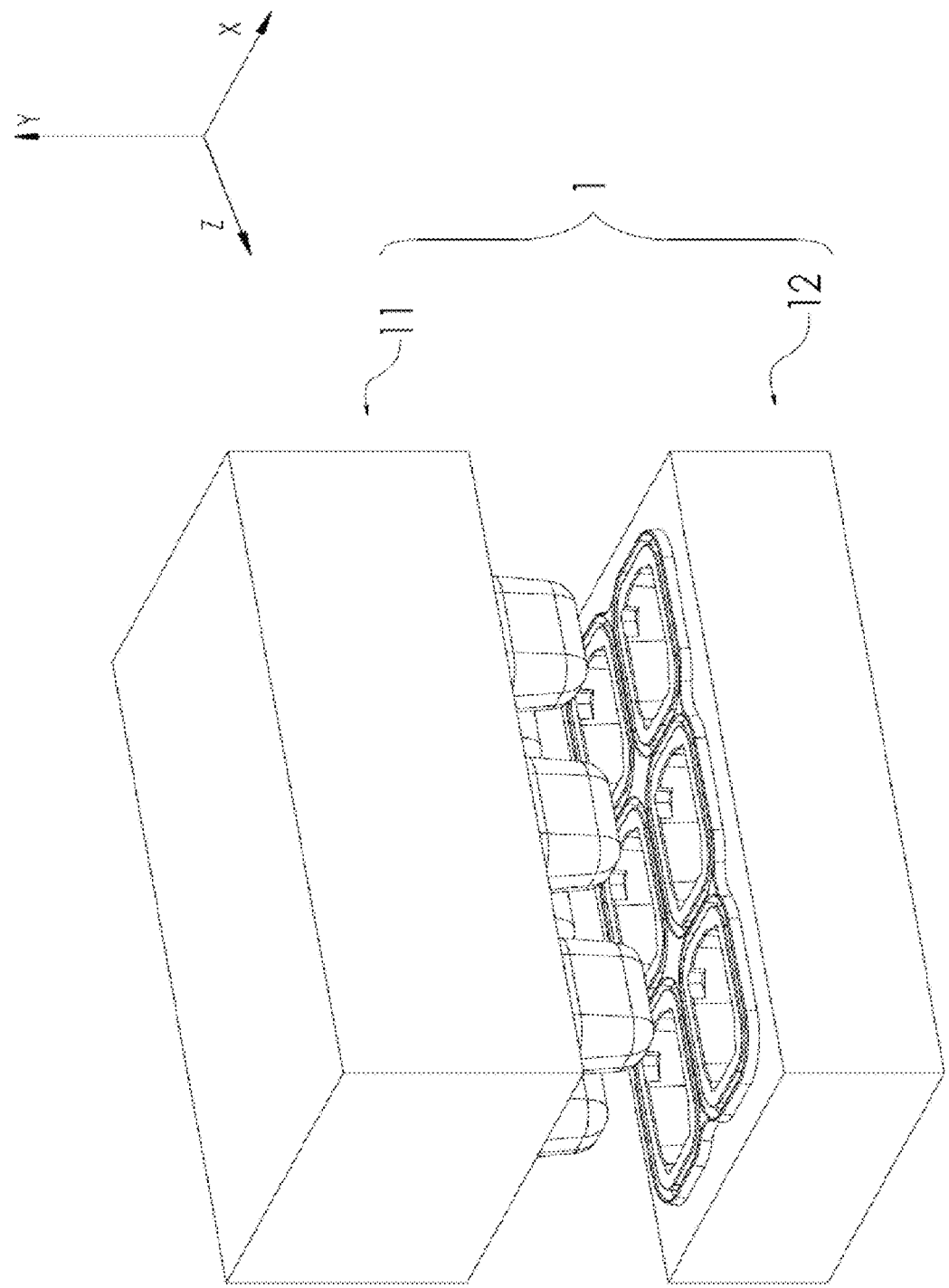
FIG. 3 depicts a perspective view of an embodiment of a forming station with a multi-cavity mould in accordance with the present invention of a thermoforming machine.
Figure 4:
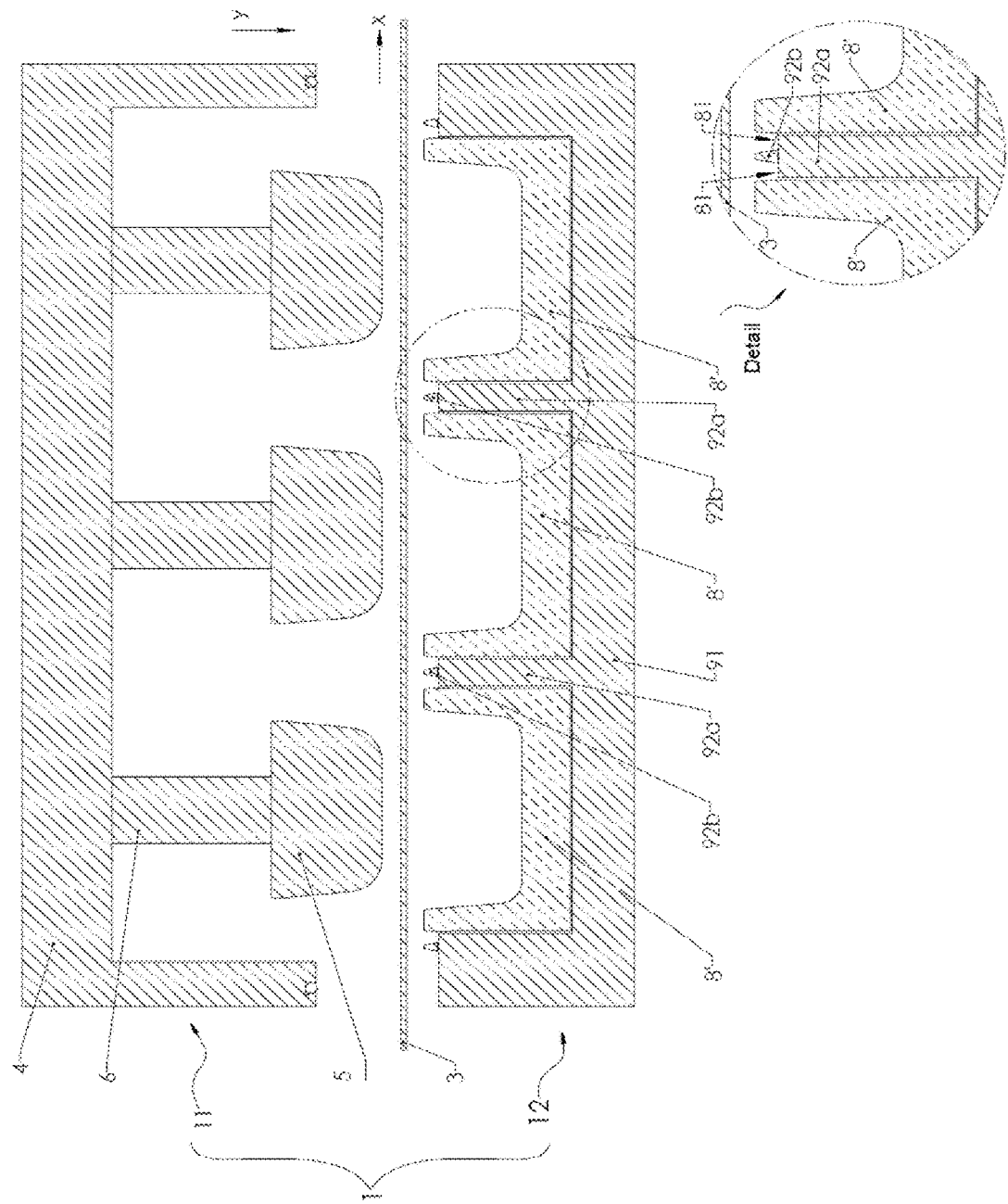
FIG. 4 depicts a detailed front view in a vertical cross section of an embodiment of a forming station with a multi-cavity mould in accordance with the present invention of a thermoforming machine in an open position.
Figure 5:
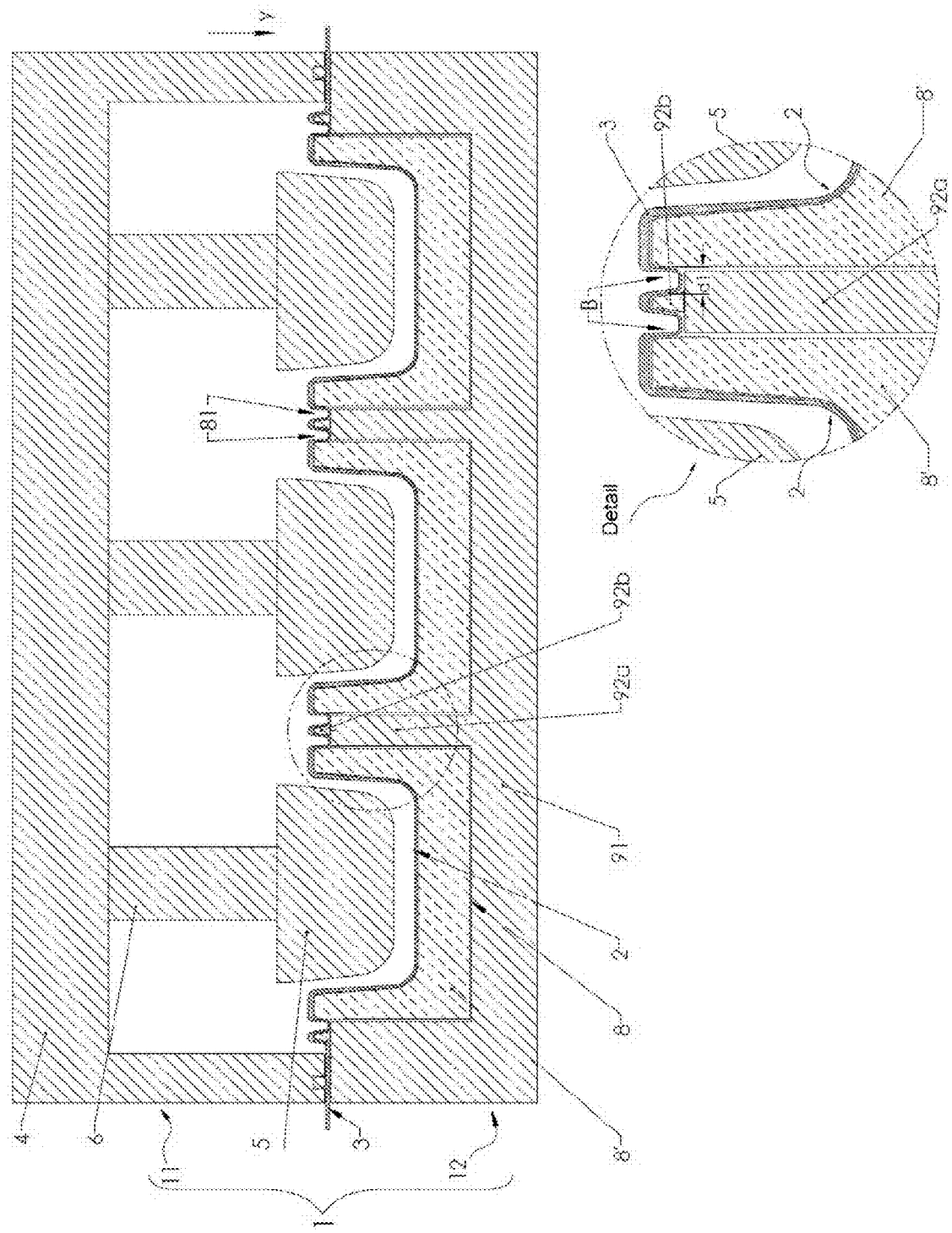
FIG. 5 depicts a detailed front view in a vertical cross section of an embodiment of a forming station with a multi-cavity mould in accordance with the present invention of a thermoforming machine in a closed position where the peripheral flange (B) of the formed products is accommodated inside the two vertical channels formed between at least two adjacent cavity moulds.

A detailed front view in a vertical cross section of a conventional supporting block (92) of a multi-cavity mould (1) is shown in FIG. 1. The width (w) of the conventional supporting block (92), as shown in FIG. 1, is usually calculated as 20-25% of the total height (a) of the supporting block (92), thus complying with the technical considerations mentioned above.

The inventive solution to the technical problems associated with the known equipments for forming a smooth periphery for thermoformed thin-gauge plastic products, provided by the present invention, is to reconfigure the supporting block's structure and profile between adjacent cavities in order to create two vertical channels. These channels are configured to allow a further extension of a peripheral flange of the thermoformed thin-gauge plastic products inside these channels by altering the thickness of the peripheral flange, to decrease from a medium thickness of the thermoformed thin-gauge thermoplastic sheet to a lesser thickness. The inventive solution complies with the technical requirements regarding rigidity, adequate space for the cooling circuit and for the ventilation channels, easy cutting of the formed products and so on.

The thermoforming process takes a sheet of thermoplastic having a nominal thickness, according to the type of material used in this process, and carefully heats it, at a forming temperature, until it is sufficiently pliable. Forming temperature vary depending on the type of thermoplastic being used, the application for the finished part, and the forming technique. This is one of the most important operating parameters in thermoforming to meet certain quality standards. The true forming temperature of a sheet is its core temperature, not its surface temperature. Hence, it is important to calculate heat transfer across the sheet. A forming temperature is any point located above the glass transition temperature and below its melting temperature.

Polymers are chemical compounds in which molecules are bonded together in long, repeating chains. Plastics are a specific type of polymer comprised of a long chain of polymers. Plastics are known for their ability to be molded, extruded, or pressed into solid objects of various shapes. There are seven main types of plastic, each suited to certain applications. The three most common types are: polyethylene (PE) with its combinations thereof like polyethylene terephthalate (PET) or amorphous polyethylene terephthalate (APET), polypropylene (PP) and polystyrene (PS). These are examples of synthetic polymers. Thermoplastics are polymers with long chains of molecules. Heat is needed to enable flow. Thermoplastics are grouped into either amorphous or semi-crystalline structures. Adding heat makes these long molecules expand/randomize and during cooling in the mold, they contract or shrink. When the temperature of a thermoplastic is increased gradually, the intermolecular forces in the polymeric chains are also weakened gradually.

Examples of semi-crystalline thermoplastics are polyethylene (PE, PET, APET) and polypropylene (PP). These exhibit an organized lattice at a temperature lower than their melting point. This type is known for its excellent wear and bearing resistance, making it ideal for structural applications and durable plastic parts. This type is also known for its better chemical resistance and insulation properties. Polystyrene (PS) is an example of an amorphous thermoplastic. These materials have a random molecular structure and have a wide range of softening temperatures. Some advantages of amorphous thermoplastics are: good dimensional stability, higher impact resistance, bond well with adhesives, and are easier to thermoform than semi-crystalline thermoplastics. The main difference between these classes of thermoplastics is the arrangement of the molecular chains and how they, in turn, affect the behavior of the polymer under heat.

Table 1 provides three examples of thermoplastics used with the present invention and their specific operating temperatures (service temperature, softening temperature, thermoforming temperature and melting point):

TABLE 1

| Plastic Type | Service Temperature (° C.) | Softening Temperature (° C.) | Thermoforming Range Temperature (° C.) | Melting Point (° C.) |
| --- | --- | --- | --- | --- |
| Polypropylene (PP) | −10 to 110 | 130-140 | 130-150 | 160-170 |
| Amorphous Polyethylene Terephthalate (APET) | −40 to 70 | 70-85 | 100-120 | 220-260 |
| Polystyrene (PS) | −40 to 90 | 95-105 | 120-160 | 240-270 |

The melting point of plastic pertains to the specific temperature at which the plastic material transitions from a solid state to a liquid one. Thermoplastic materials become fully liquid at their melting point. The service temperature is the temperature at which the material can be maneuvered and at this temperature the material has a nominal thickness. As heat is applied (at a softening temperature), the plastic material gradually begins to soften. Above the softening temperature, the once rigid and brittle solid material is turned into a soft and pliable rubber-like material. This transition is the glass transition. If we continue to apply heat, the plastic material will gradually melt. After the plastic material is heated at the thermoforming or forming temperature, its thickness will decrease to a medium thickness compared to the nominal thickness of the plastic material and its overall dimensions will expand.

Shrinkage of thermoplastics has a significant impact on both part design and tool design. A semi-crystalline polymer means that the material exhibits organized and tightly packed molecular chains. The areas of crystallinity are called spherulites and can vary in shape and size with amorphous areas existing between the crystalline areas. Thus, this highly organized molecular structure results in a defined melting point. These polymers are anisotropic in flow, so they exhibit greater shrinkage transverse to flow rather than with the flow, which can sometimes result in some dimensional instability. Semi-crystalline polymers generally shrink more than amorphous polymers. Because semi-crystalline polymers have regions of crystalline structure, they often shrink differently in different directions.

While semi-crystalline polymers exhibit organized and tightly packed molecular chains, the polymer chains for amorphous plastics are more disorganized. In this type of material, the molecules are oriented randomly and are intertwined, which causes them to have a range of temperatures at which they will melt. This characteristic also makes for an easier thermoforming process. These polymers are isotropic in flow, so they shrink uniformly in the direction of the flow and transverse to flow. This typically results in less shrinkage and less tendency to warp. Shrinkage values are often different in the flow direction and in the cross flow direction. This is typically due to orientation of the molecules. The shrink ratio for the example materials given (see table 1 above), used in the process of thermoforming are: 1.5%-1.8% for Polypropylene (PP), 0.3-0.4% for Polyethylene terephthalate (PET) and 0.65% for Polystyrene (PS). Table 2 below summarizes some important properties of the example materials given (see table 1 above), used in the process of thermoforming:

TABLE 2

| Properties | Polymer type | |
| --- | --- | --- |
| | Amorphous | Crystalline |
| Chain Structure | Random/Disordered | Ordered/Stable |
| Melting Point | None defined/ softens gradually | Distinct/crystalline disassociation |
| Shrinkage | Low | High |
| Appearance | Transparent | Opaque |
| Chemical Resistance | Low | High |
| Examples | PS | PP, PET, APET |

Small differences in film/sheet temperature can affect thickness distribution in the final part. The part/product thickness determines the gauge of thermoplastic that is used for the manufacturing process. The different thicknesses require machinery and techniques applicable to fit the material's thickness. The thin-gauge thermoplastic films have a nominal thickness between 0.2 and 2 mm. One of the common problems in thermoforming is part/product thickness inconsistency. Overall thickness of the formed part/product is not uniform. This is primarily caused by uneven distribution of the plastic sheet. In the design of the part/product itself, thickness is difficult to control at the edges of the thermoformed product. The present invention addresses this common problem and the problems mentioned above by reconfiguring the supporting block's (92) structure and profile between adjacent cavities (8) in order to create two vertical channels (81). The invention will be detailed below.

With reference to FIGS. 2 to 5, a multi-cavity mould (1) for a thermoforming machine used in the process of high-volume, continuous thermoforming of a plurality of thin-gauge plastic products (2) from a preheated thin-gauge thermoplastic sheet (3) according to the present invention is disclosed comprising an upper tool (11) and a lower tool (12) arranged in a cooperating manner to simultaneously form a plurality of thin-gauge plastic products (2). The multi-cavity mould (1) can be used as a forming station of a thermoforming machine such as the Form/Cut/Stack thermoforming machine or can be adapted to be used as a heating-forming-cutting station inside a Cut-in-Place thermoforming machine or as a forming-cutting station in a In-Mold-Cut thermoforming machine or as a forming station in a Integrated Punch-and-Die Cutting and Stacking thermoforming machine.

The upper tool (11) comprises a top base plate (4) and a plurality of plug moulds (5) arranged in an x-z array and connected in a translational manner to the top base plate (4) by means of driving rods (6) such that the plug moulds (5) are movable in a direction (y) perpendicular to a transport direction (x) of the preheated thin-gauge thermoplastic sheet (3).

The lower tool (12) comprises a plurality of cavities (8) in which cavity moulds (8') may be placed and a plurality of base plates (91) from which a plurality of supporting blocks (92) extend perpendicularly over a predetermined total height (a), situated between adjacent cavities (8). Preferably, the base plates (91), the supporting blocks (92) and the cavity moulds (8') are made of an Aluminum alloy selected from a group consisting of 5083, 6082 or 7075 Aluminum alloys. These are known for their low density (the overall weight of a mould is therefore lower and can be easily transported), higher strength when compared to steel, relatively soft, ductile and easily workable under normal temperature. The tensile strength of these Aluminum alloys is higher than aluminum. The electrical and heat conductivity is less than that of pure aluminum and more than that of steel (the mould can have a relatively constant temperature in its entire groundmass). These can be easily forged, casted and worked with respect to their low melting point, especially on numerically controlled tools.

The upper tool (11) and the lower tool (12) are being operable to simultaneously form a plurality of thin-gauge plastic products (2) in corresponding cavity moulds (8') arranged inside the cavities (8) of the lower tool (12) in an x-z array. Further, each supporting block (92) is divided into two distinct zones. The first zone is a substantially rectangular shaped zone (92a) in a vertical cross section through a y-z plane, extending perpendicularly from the base plate (91) over a distance (a1) calculated as 92-95% of the total height (a) of the supporting block (92) and the width (w) of the first zone (92a) is calculated as 10-15% of the total height (a) of the supporting block (92).

The second zone is a substantially isosceles trapezoid shaped zone (92b) in a vertical cross section through the y-z plane. The term "isosceles trapezoid shape" can be defined as a trapezoid with two bases (i.e. parallel sides), in which both legs (i.e. non-parallel sides) have the same length; the base angles have the same measure pair wise and the trapezoid has a line of symmetry through the midpoints of opposite sides. The segment that joins the midpoints of the parallel sides (i.e. top base and bottom base) is perpendicular to them. In the context of the present invention, the term "isosceles trapezoid shape" is limited to a "convex isosceles trapezoid shape". In an isosceles trapezoid, the base angles have the same measure pair wise: two obtuse angles of the same measure and two acute angles, also of the same measure. According to an embodiment of the present invention, both acute base angles of the second zone (92b) are of about 85° to about 89°.

The first and second zones (92a, 92b) have a common symmetry axis in the vertical cross section through the y-z plane, perpendicular to the base plate (91). Also, the adjacent cavity moulds (8') may have a stepped profile, on their exterior surface, which corresponds in a complementary manner to the profile of the supporting block (92) between them. The second substantially isosceles trapezoid shaped zone (92b) extends in continuation of the first zone (92a) over a distance (a2) calculated as 5-8% of the total height (a) of the supporting block (92) and the second zone (92b) has a bottom base in contact with the first zone (92a) and centered relative to the common symmetry axis, a top base and two legs of equal length between the top and bottom bases. The width (w1) of the top base of the second zone (92b) is calculated as 2.5-5% of the total height (a) of the supporting block (92). The bottom base of the second zone (92b) may not have the same width as the first zone (92a). In the region of the first zone (92a), the cooling channels may be provided.

Two vertical channels (81) are formed between at least two adjacent cavity moulds (8') for accommodating a peripheral flange (B) of each of the thermoformed plastic products (2). As described in FIG. 7, a peripheral flange (B) comprises an outside flange (B1) and a secondary flange (B2). The outside flange (B1) extends in continuation of a primary flange (A) of the thermoformed plastic product (2). The primary flange (A) is the flange that is integrally joined to the upper edges of the sidewalls of the thermoformed plastic product (2) and extending outwardly all around the upper periphery of these sidewalls. The outside flange (B1) is a downward flap extending downwardly and tapering slightly outwardly from the outer periphery of the primary flange (A). The secondary flange (B2) is an overhanging portion extending outwardly from the lower edge of the outside flange (B1) used for connecting two adjacent formed products (2) and the web between them in the forming and/or cutting stations of a thermoforming machine.

The two vertical channels (81) are configured to alter, during forming of the plurality of thin-gauge plastic products (2), a thickness of the peripheral flange (B), to decrease from a medium thickness (t) of the thermoformed thin-gauge thermoplastic sheet (3) obtained during heating of the thermoplastic sheet (3) at a forming temperature, to a lesser thickness (t1). This is due to the configuration of the two vertical channels (81) which allow a further expansion of the thermoplastic sheet (3) in these relatively narrow channels (81) during the forming stage at the forming temperature. During forming, the thermoplastic sheet (3) is drawn down in thickness in proportion to the additional area created, i.e. the two vertical channels (81). Each of the two vertical channels (81) has preferably a predetermined medium width (d1) of about 2 mm to about 6 mm, more preferably of about 4.5 mm. The peripheral flange's (B) lesser thickness (t1) is preferably decreased to less than ½ of the medium thickness (t) of the thermoformed thin-gauge thermoplastic sheet (3) of each of the thermoformed thin-gauge plastic products (2). For example, if the used thin-gauge thermoplastic sheet (3) is Polyethylene terephthalate (PET), the peripheral flange's (B) thickness (t1) is preferably decreased to about 0.1 mm to 0.15 mm, more preferably to 0.12 mm, because the lesser the thickness of the peripheral flange (B) is, the higher will be the efficiency for forming a smooth periphery for the formed products (2) later on. This is achieved due to the polymers chemical properties when subjected to heat, more specifically to their softening temperature. They shrink when heated at their softening temperature as their molecular chains curl up. A thin film of a plastic, for example a polyolefin such as, polyethylene terephthalate (PET), is oriented such that the polymer chains are stretched out (an extended, oriented polymer film). When the heat is directed to the extended polymer film, the film shrinks into place. During orientation or forming, the polymer is locked, or frozen, into its elongated state. Excess energy (i.e. heat) increases molecular motion. The elongated polymer recoils, or shrinks, or more correctly, it recovers in length, forming a curled region.

Product ventilation does not suffer due to the re-configuration of the supporting block (92) and of the adjacent cavities (8)/adjacent cavity moulds (8'). The air trapped in the upper areas of the finished products (2) is evacuated for example through ventilation holes and/or channels in the supporting block (92) (not represented in the figures).

Figure 6:
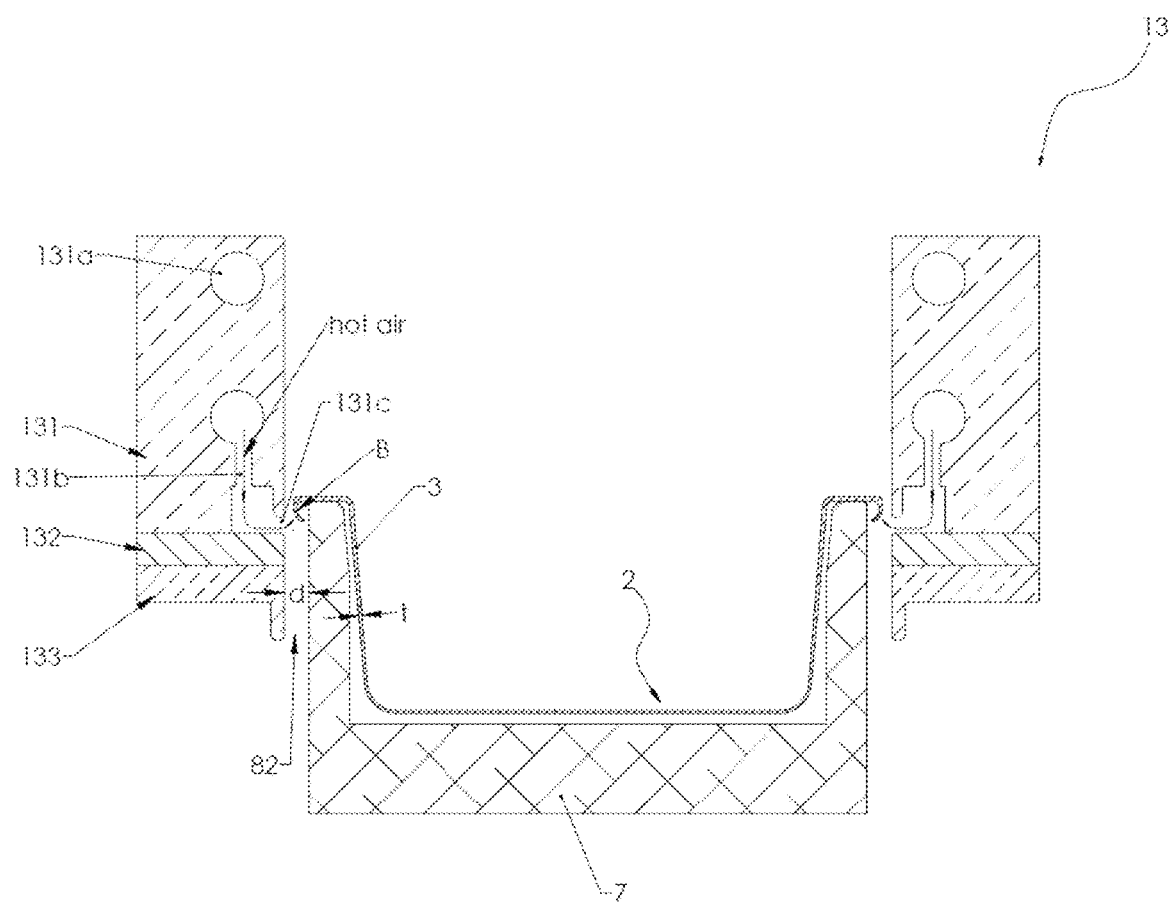
FIG. 6 depicts a detailed front view in a vertical cross section of an embodiment of a heating element for forming a smooth periphery for a plurality of thermoformed thin-gauge plastic products, formed in a multi-cavity mould in accordance with the present invention.

After forming the plurality of thermoformed thin-gauge plastic products (2) in the multi-cavity mould (1) as described above, the products (2) located inside the thin-gauge thermoplastic sheet (3) are further transported to a cutting station of the thermoforming machine. Each thermoformed plastic product (2) is then separated from the thin-gauge thermoplastic sheet (3) by cutting along a contour line of the products (2) within the cutting station. Each plastic product (2) has a primary flange (A) and a peripheral flange (B) as defined above. The scrap or web is discarded or recycled. The cut thermoformed plastic products (2) are then transported to a stacker station of the thermoforming machine comprising a heating element (13). This heating element (13) may be also a separate equipment (as seen in FIG. 6) i.e. not forming part of a stacker station.

The heating element (13) is configured to form a smooth periphery for a plurality of thermoformed thin-gauge plastic products (2), formed in a multi-cavity mould (1) as described above. The heating element (13) comprises a substantially concave-shaped manipulation device (7) for holding therein each of the thermoformed thin-gauge plastic products (2) such that the peripheral flange (B) of each of the thermoformed plastic products (2) is extending over each wall of the concave-shaped manipulation device (7).

In the context of the present invention, a concave-shape should be understood as a shape that curves and/or slopes inward. The concave-shape is a three-dimensional (3D) shape which can hold therein an item like a product or part. The word "concave" means curved or sloped/inclined inward or having a "cave" inside. 3D shapes have faces or walls, edges and vertices. They have depth and so they occupy some volume.

According to a preferred embodiment of the present invention, the substantially concave-shaped manipulation device (7) is preferably a mechanical stacker or a down stacker or a robotic stacker or any other substantially concave-shaped manipulation device (7). It can be in the form of a cup, bowl or of a substantially rectangular tray. The substantially concave-shaped manipulation device (7) is preferably made of a thermally conductive material with a liquid based cooling system, more preferably Aluminum with a water based cooling system. The manipulation device (7) acts as a protective shield between the formed product (2) and the hot air within the heating element (13). The walls of the manipulation device (7) will protect against heat the walls of the formed products (2) which are placed inside the manipulation device (7).

Further, the heating element (13) comprises a radiant heated peripheral plate (131) disposed at a minimum distance (d), around each wall of the concave-shaped manipulation device (7) to create a gap (82) for accommodating the peripheral flange (B) therein. The minimum distance (d) is preferably about 1 mm to about 4 mm. Preferably, the radiant heated peripheral plate (131) is made of an Aluminum alloy selected from a group consisting of 5083, 6082 or 7075 Aluminum alloys having the advantages mentioned above. The radiant heated peripheral plate (131) further comprises a housing for an electric heating source (131a) mounted therein. This source (131a) is preferably a Hot Air Gun Source. This is an electric tool operating a fan that pulls air into the body of the tool and drives it across an electric heating element and out through a nozzle or a plurality of nozzles. They are lightweight and easy-to-use tools. One advantage of this tool is the heat is almost instantaneous, so it can be switched off during pauses while working. It is a safer source of heat and allows an easy adjustment of the temperature.

The radiant heated peripheral plate (131) further comprises a plurality of hot air distribution channels (131*b*) which are in fluid communication with the electric heating source (131*a*) and with a plurality of outlet slits (131*c*) configured to direct a flow of hot air at a regulated temperature (T) during a predetermined exposure period (EP) set by a control unit connected to the radiant heated peripheral plate (131) around the peripheral flange (B). The regulated temperature (T) is a temperature set in the heating element (13) which aids the peripheral flange (B) of the formed products (2) to reach a softening temperature. In a preferred embodiment of the present invention, the regulated temperature (T) is preferably of about 100° C. to about 300° C., more preferably 200° C. The predetermined exposure period (EP) is expressed in terms of a continuous variable, such as the time equipment is operating and is the total time period over which a flow of hot air is directed towards a target (i.e. a peripheral flange (B)). In a preferred embodiment of the present invention, the predetermined exposure period (EP) is preferably about 0.5 seconds to 3 seconds. Upon direct exposure of the peripheral flange (B) to the flow of hot air at a regulated temperature (T) during a predetermined exposure period (EP), the peripheral flange's (B) lesser thickness (t1) of each of said thermoformed thin-gauge plastic products (2) will gradually increase from the lesser thickness (t1) to the medium thickness (t) of the thermoformed thin-gauge thermoplastic sheet (3) without exceeding the medium thickness (t), by developing a partial curled region (b) oriented towards an interior side of the preheated thin-gauge thermoplastic sheet (3) or towards a corresponding exterior wall of each of the thermoformed thin-gauge plastic products (2). The partial curled region (b) has a smooth exterior contour. The interior side of the preheated thin-gauge thermoplastic sheet (3) or of the formed product (2) is the side that is oriented towards a lower or bottom part of the mould when the preheated thin-gauge thermoplastic sheet (3) is viewed in the transport direction (x).

Figure 7:
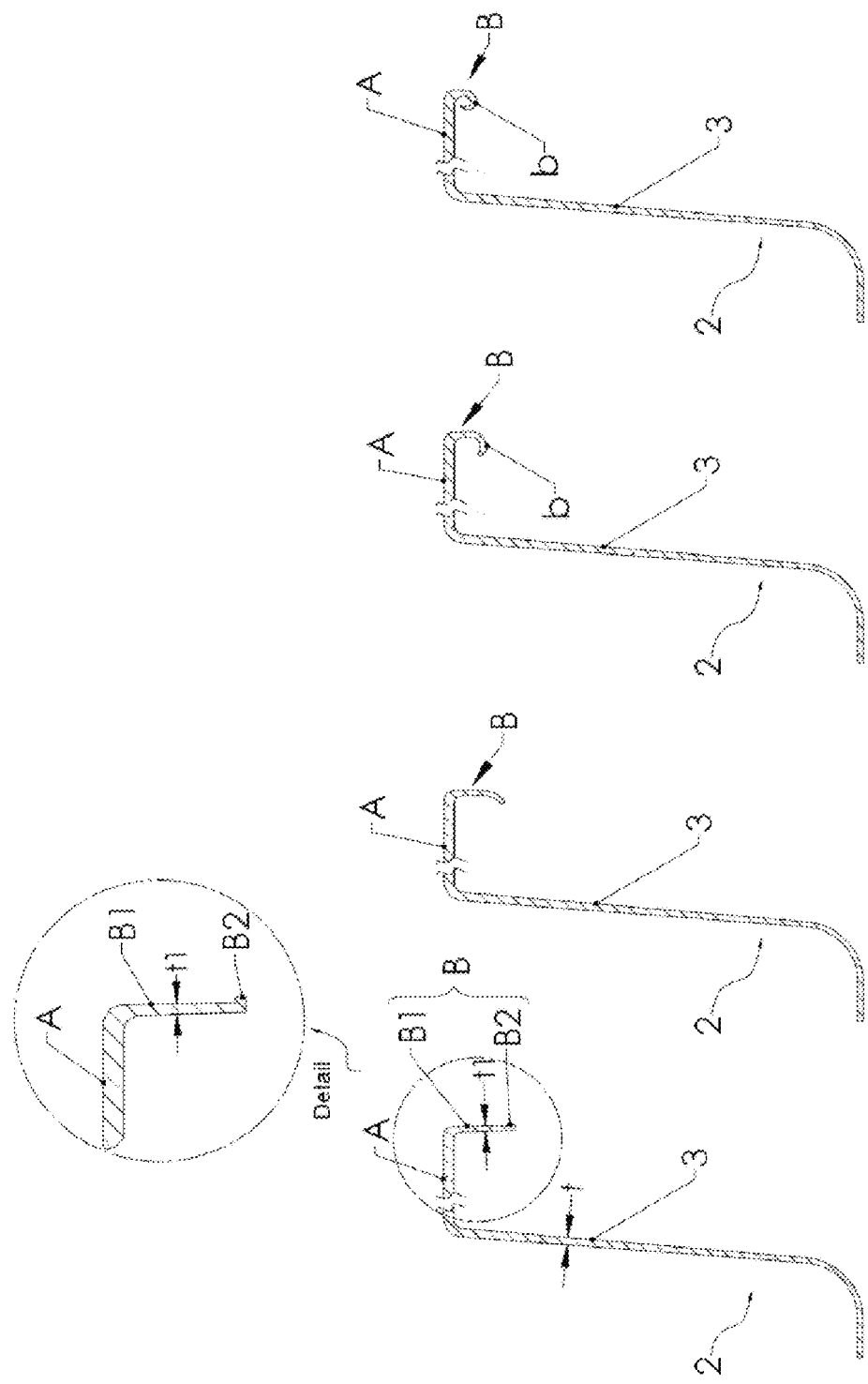
FIG. 7 depicts a detailed front view in a vertical cross section of a peripheral flange and of the process of forming a smooth periphery for a plurality of thermoformed thin-gauge plastic products in accordance with the present invention.

Due to the pre-extended length of the peripheral flange (B) and of the softening temperature reached by the peripheral flange's material, this partial curled region (b) is obtained. If one out of these two conditions is not met, the result will be a creasing of the periphery or the flange melting. The partial curled region (b) has a partial bend or curve in a vertical cross section through a plane comprising the primary flange (A) (as seen in FIG. 7).

The heating element (13) comprises also an insulation plate (132) disposed between a stripper plate (133) and the radiant heated peripheral plate (131). In a preferred embodiment of the present invention, the insulation plate (132) is preferably made of an insulating ceramic material, more preferably an Aluminum silicate ceramic fiber board or an Epoxy-based Syntactic Foam (ESF) with preferably a service temperature of 230° C. Ceramic fiber board is a kind of refractory material, usually composed of alumina and silicate, and it is also called an aluminum silicate board. Ceramic fiber board is made of ceramic fiber cotton, natural refractory raw materials, and a small amount of organic binder as the main raw materials. After heating, it has very good mechanical properties and has a certain hardness support, which save energy and reduce consumption, high quality, and high output. It has a high compressive strength and a high temperature resistance. It can withstand a certain amount of pressure and maintain structural integrity and stability. Ceramic fiber board ensures the reliability and safety of the product during use. It has a long service life. Also, the Epoxy-based Syntactic Foam (ESF) is a good material alternative for manufacturing the insulation plate (132) because of its high compressive strength and high temperature resistance.

The stripper plate (133) is a plate that holds the thermoplastic sheet (3) and the formed and then cut thin-gauge plastic products (2); either the ones that remain attached to the thermoplastic sheet (3), via tiny precise notches (also called "nicks"), while the pusher breaks the tags which hold the formed products (2) and release them from the sheet (3) or just the cut thin-gauge plastic products (2) when no nicks are used (for example in a Integrated Punch-and-Die Cutting and Stacking thermoforming machine). The stripper plate (133) is cooled to not overheat the formed products (2) and preferably has a liquid based cooling system, for example, water based.

In a preferred embodiment of the present invention, a thermoforming machine used in the process of high-volume, continuous thermoforming of a plurality of thin-gauge plastic products (2) from a preheated thin-gauge thermoplastic sheet (3) may comprise a multi-cavity mould (1) as described above as a forming station and a heating element (13) for forming a smooth periphery for the plurality of thermoformed thin-gauge plastic products (2). The heating element (13) is mounted inside a stacker station of the thermoforming machine.

A method for forming a smooth periphery for a plurality of thermoformed thin-gauge plastic products (2), formed in a multi-cavity mould (1) of a thermoforming machine as described above and according to the present invention comprises the following successive steps of:

a) feeding a preheated thin-gauge thermoplastic sheet (3) between the upper tool (11) and lower tool (12) of the multi-cavity mould (1) in a transport direction (x); The preheating is done at a forming temperature according to the specific thermoplastic material used.

b) forming the thermoformed plastic products (2) in corresponding cavity moulds (8') arranged inside the plurality of cavities (8) of the lower tool (12) in an x-z array and simultaneously altering a thickness of the peripheral flange (B) of each thermoformed plastic products (2) to decrease from a medium thickness (t) of the thermoformed thin-gauge thermoplastic sheet (3) to a lesser thickness (t1) within the two vertical channels (81) as described above;

c) transporting the thermoformed plastic products (2) located inside the thin-gauge thermoplastic sheet (3) further to a cutting station of the thermoforming machine;

In some of the known thermoforming machines, the formed and then trimmed thin-gauge plastic products (2) remain attached to the thermoplastic sheet (3) via tiny precise notches (also called "nicks") to be easily transported to the next station. On the perimeter of the cutting knife blade, there are small notches. Where there is a notch in the cutting knife it will not cut the sheet (3), and the products (2) will remain attached to the sheet (3) by the uncut perimeter points. These points are called "witness marks" or "tags". The cut products (2) remain attached to the sheet (3), by these tags, while the sheet (3) continues its path through the thermoforming machine to the final stacking station. The stacker or stacking station comprises two parts: the lower part, with a series of plates/pushers that are shaped as the formed products (2). These pushers break the tags which hold the formed products (2) and release them from the sheet (3) and the upper part of the stacker, allows collecting the final products (2), stacking and counting the products (2) before ejecting them into piles on the tray.
  d) cutting along a contour line of the products (2) within the cutting station;
  e) transporting the cut thermoformed plastic products (2) to a stacker station of the thermoforming machine comprising a heating element (13) as described above;
  f) bringing the cut thermoformed plastic products (2) in a position where their peripheral flange (B) is accommodated inside the gap (82) and aligned with the outlet slits (131c) of the heating element (13);
  g) directing a flow of hot air at a regulated temperature (T) around the peripheral flange (B) of each thermoformed plastic product (2) through the outlet slits (131c) during a predetermined exposure period (EP) set by the control unit to determine the peripheral flange's (B) lesser thickness (t1) of each of the thermoformed thin-gauge plastic products (2) to gradually increase from the lesser thickness (t1) to the medium thickness (t) of the thermoformed thin-gauge thermoplastic sheet (3) without exceeding the medium thickness (t) by developing a partial curled region (b) oriented towards an interior side of the thermoplastic sheet (3) or towards a corresponding exterior wall of each of the plastic products (2), the partial curled region (b) having a smooth exterior contour;
  h) stacking the thermoformed thin-gauge plastic products (2) with the partial curled region (b) having a smooth exterior contour for future packaging options.

In a preferred embodiment of the present invention, for a In-Mold-Cut thermoforming machine wherein both forming and cutting happen in the same station, steps b) to d) are performed sequentially within the same station. The system ensures greater precision of the perimeter cut because the process happens in the same station without moving the sheet (3), and there is no material shrinkage. In another preferred embodiment, for a Cut-in-Place thermoforming machine wherein the heating, forming and cutting happen in the same station, steps a) to d) are performed sequentially within the same station.

In yet another preferred embodiment, for a Integrated Punch-and-Die Cutting and Stacking thermoforming machine where forming is happening in a separate station from the cutting and stacking which happen in the same combined station, steps c) to h) are performed sequentially within the same station.

What has been described and illustrated herein is an example of the disclosure along with some of its optional features. The terms, descriptions and figures used herein are set forth by way of illustration only and are not meant as limitations. The scope of the disclosure is intended to be defined by the following claims.

The invention claimed is:

1. A multi-cavity mould (1) for a thermoforming machine used in the process of high-volume, continuous thermoforming of a plurality of thin-gauge plastic products (2) from a preheated thin-gauge thermoplastic sheet (3) comprising an upper tool (11) and a lower tool (12) arranged in a cooperating manner;
  the upper tool (11) comprising:
    a top base plate (4) and
    a plurality of plug moulds (5) arranged in an x-z array and connected in a translational manner to said top base plate (4) by means of driving rods (6) such that said plug moulds (5) are movable in a direction (y) perpendicular to a transport direction (x) of said preheated thin-gauge thermoplastic sheet (3);
  the lower tool (12) comprising:
    a plurality of cavities (8) configured to receive cavity moulds (8') and
    a plurality of base plates (91) from which a plurality of supporting blocks (92) extend perpendicularly over a predetermined total height (a), situated between adjacent cavities (8),
  the upper tool (11) and the lower tool (12) are being operable to simultaneously form a plurality of thin-gauge plastic products (2) in corresponding cavity moulds (8') arranged inside the cavities (8) of said lower tool (12) in an x-z array and
  each of said supporting block (92) has a first substantially rectangular shaped zone (92a) in a vertical cross section through a y-z plane, said first zone (92a) extending perpendicularly from said base plate (91) over a distance (a1) calculated as 92-95% of the total height (a) of said supporting block (92) and the width (w) of the first zone (92a) is calculated as 10-15% of the total height (a) of said supporting block (92)
  characterized in that
  each of said supporting block (92) has a second substantially isosceles trapezoid shaped zone (92b), having a common symmetry axis with said first substantially rectangular shaped zone (92a) in the vertical cross section through said y-z plane perpendicular to said base plate (91), wherein said second substantially isosceles trapezoid shaped zone (92b) extends in continuation of said first zone (92a) over a distance (a2) calculated as 5-8% of the total height (a) of said supporting block (92), wherein the second zone (92b) has a bottom base in contact with the first zone (92a) and centered relative to said common symmetry axis, a top base and two legs of equal length between the top and bottom bases, and the width (w1) of the top base of said second zone (92b) is calculated as 2.5-5% of the total height (a) of said supporting block (92) and
  two vertical channels (81) are formed between at least two adjacent cavity moulds (8') for accommodating a peripheral flange (B) of each of said thermoformed plastic products (2), such that said two vertical channels (81) are configured to alter, during forming of the plurality of thin-gauge plastic products (2), a thickness of said peripheral flange (B), to decrease from a medium thickness (t) of the thermoformed thin-gauge thermoplastic sheet (3) to a lesser thickness (t1).

2. The multi-cavity mould (1) according to claim 1, wherein said peripheral flange's (B) lesser thickness (t1) is decreased to less than ½ of said medium thickness (t) of the thermoformed thin-gauge thermoplastic sheet (3) of each of said thermoformed thin-gauge plastic products (2).

3. The multi-cavity mould (1) according to claim 1, wherein both acute base angles of said second zone (92b) are of about 85° to about 89°.

4. The multi-cavity mould (1) according to claim 1, wherein each of said two vertical channels (81) has a predetermined medium width (d1) of about 2 mm to about 6 mm.

5. An assembly including a multi-cavity mould according to claim 1, and a heating element (13) for forming a smooth periphery for a plurality of thermoformed thin-gauge plastic products (2), formed in the multi-cavity mould (1) according to claim 1, the heating element (13) comprising:
  a substantially concave-shaped manipulation device (7) for holding therein each of said thermoformed thin-gauge plastic products (2) such that a peripheral flange (B) of each of said thermoformed plastic products (2) is extending over each wall of said concave-shaped manipulation device (7);

a radiant heated peripheral plate (131) disposed at a minimum distance (d), around each wall of said concave-shaped manipulation device (7) to create a gap (82) for accommodating said peripheral flange (B) therein and a control unit connected to the radiant heated peripheral plate (131)

an insulation plate (132) disposed between a stripper plate (133) and said radiant heated peripheral plate (131)

characterized in that said radiant heated peripheral plate (131) comprises:

a housing for an electric heating source (131*a*) mounted therein;

a plurality of hot air distribution channels (131*b*) which are in fluid communication with said electric heating source (131*a*) and with a plurality of outlet slits (131*c*) configured to direct a flow of hot air at a regulated temperature (T) during a predetermined exposure period (EP) set by the control unit around said peripheral flange (B) which has a lesser thickness (t1) compared to a medium thickness (t) of the thermoformed thin-gauge thermoplastic sheet (3) of each of said thermoformed thin-gauge plastic products (2)

such that said peripheral flange's (B) lesser thickness (t1) of each of said thermoformed thin-gauge plastic products (2) is configured to gradually increase from said lesser thickness (t1) to the medium thickness (t) of the thermoformed thin-gauge thermoplastic sheet (3) without exceeding the medium thickness (t) upon exposure to said flow of hot air at said regulated temperature (T) and during said predetermined exposure period (EP), by developing a partial curled region (b) oriented towards an interior side of said preheated thin-gauge thermoplastic sheet (3) or towards a corresponding exterior wall of each of said thermoformed thin-gauge plastic products (2), said partial curled region (b) having a smooth exterior contour.

6. The assembly according to claim 5, wherein said minimum distance (d) is about 1 mm to about 4 mm.

7. The assembly according to claim 5 wherein the regulated temperature (T) is about 100° C. to about 300° C.

8. The assembly according to claim 5 wherein the predetermined exposure period (EP) is about 0.5 seconds to 3 seconds.

9. The assembly according to claim 5 wherein said insulation plate (132) is made of an insulating ceramic material chosen from an Aluminum silicate ceramic fiber board or an Epoxy-based Syntactic Foam (ESF) with a service temperature of 230° C.

10. The assembly according to claim 5 wherein said stripper plate (133) has a liquid based cooling system.

11. The assembly according to claim 5 wherein said substantially concave-shaped manipulation device (7) is made of a thermally conductive material with a liquid based cooling system.

12. Thermoforming machine used in the process of high-volume, continuous thermoforming of a plurality of thin-gauge plastic products (2) from a preheated thin-gauge thermoplastic sheet (3) comprising:

a multi-cavity mould (1) according to claim 1 as a forming station, and a heating element (13) for forming a smooth periphery for said plurality of thermoformed thin-gauge plastic products (2), said heating element (13) being mounted inside a stacker station of said thermoforming machine and wherein said substantially concave-shaped manipulation device (7) is a mechanical stacker or a down stacker or a robotic stacker.

13. A method for forming a smooth periphery for a plurality of thermoformed thin-gauge plastic products (2), formed in a multi-cavity mould (1) of a thermoforming machine according to claim 1 comprising the following successive steps of:

a) feeding a preheated thin-gauge thermoplastic sheet (3) between the upper tool (11) and lower tool (12) of the multi-cavity mould (1) in a transport direction (x);

b) forming said thermoformed plastic products (2) in corresponding cavity moulds (8') arranged inside the plurality of cavities (8) of the lower tool (12) in an x-z array and simultaneously altering a thickness of the peripheral flange (B) of each thermoformed plastic products (2) to decrease from a medium thickness (t) of the thermoformed thin-gauge thermoplastic sheet (3) to a lesser thickness (t1) within the two vertical channels (81);

c) transporting the thermoformed plastic products (2) located inside said thin-gauge thermoplastic sheet (3) further to a cutting station of said thermoforming machine;

d) cutting along a contour line of the products (2) within the cutting station;

e) transporting the cut thermoformed plastic products (2) to a stacker station of said thermoforming machine comprising a heating element (13);

f) bringing the cut thermoformed plastic products (2) in a position where their peripheral flange (B) is accommodated inside the gap (82) and aligned with the outlet slits (131*c*) of said heating element (13);

g) directing a flow of hot air at a regulated temperature (T) around the peripheral flange (B) of each thermoformed plastic product (2) through the outlet slits (131*c*) during a predetermined exposure period (EP) set by the control unit to determine said peripheral flange's (B) lesser thickness (t1) of each of said thermoformed thin-gauge plastic products (2) to gradually increase from said lesser thickness (t1) to the medium thickness (t) of the thermoformed thin-gauge thermoplastic sheet (3) without exceeding the medium thickness (t) by developing a partial curled region (b) oriented towards an interior side of said preheated thin-gauge thermoplastic sheet (3) or towards a corresponding exterior wall of each of said thermoformed thin-gauge plastic products (2), said partial curled region (b) having a smooth exterior contour;

h) stacking the thermoformed thin-gauge plastic products (2) with said partial curled region (b) having a smooth exterior contour for future packaging options.

* * * * *